United States Patent
Kondou et al.

(10) Patent No.: US 6,395,322 B2
(45) Date of Patent: May 28, 2002

(54) METHOD FOR PRODUCING FROZEN FRIED FOODS FOR MICROWAVE COOKING

(75) Inventors: Hideyuki Kondou; Kenichi Nagashima, both of Kawasaki; Masata Mitsuiki, Gunma-ken, all of (JP)

(73) Assignee: Ajinomoto Co., Inc., Tokyo (JP)

( * ) Notice: Subject to any disclaimer, the term of this patent is extended or adjusted under 35 U.S.C. 154(b) by 0 days.

(21) Appl. No.: 09/776,684

(22) Filed: Feb. 6, 2001

(30) Foreign Application Priority Data

Feb. 10, 2000 (JP) ........................................ 2000-033737

(51) Int. Cl.$^7$ ................................................ A23L 3/00
(52) U.S. Cl. ...................................... 426/524; 426/393
(58) Field of Search ................................ 426/524, 438, 426/637, 393

(56) References Cited

U.S. PATENT DOCUMENTS 4,579,743 A * 4/1986 Hullah ........................ 426/524
5,244,674 A * 9/1993 Cadas et al. ................. 426/524

* cited by examiner

*Primary Examiner*—George C. Yeung
(74) *Attorney, Agent, or Firm*—Oblon, Spivak, McClelland, Maier & Neustadt, P.C.

(57) ABSTRACT

There is provided a method for producing a frozen fried food for a microwave cooking comprising the step of a freezing of, particularly a very quick freezing (immediate quick freezing) of a deep-fat fried food, more particularly immediately after the oil-cooking thereof, at a moving speed of the freezing front exceeding 20 cm/h. A frozen product of deep-fat fried food capable of re-exhibiting a favorable crispness of a breading even after heating the frozen food by a microwave oven, and also capable of maintaining such favorable eating quality even after a prolonged storage thereof in a domestic freezer can be produced.

18 Claims, 2 Drawing Sheets

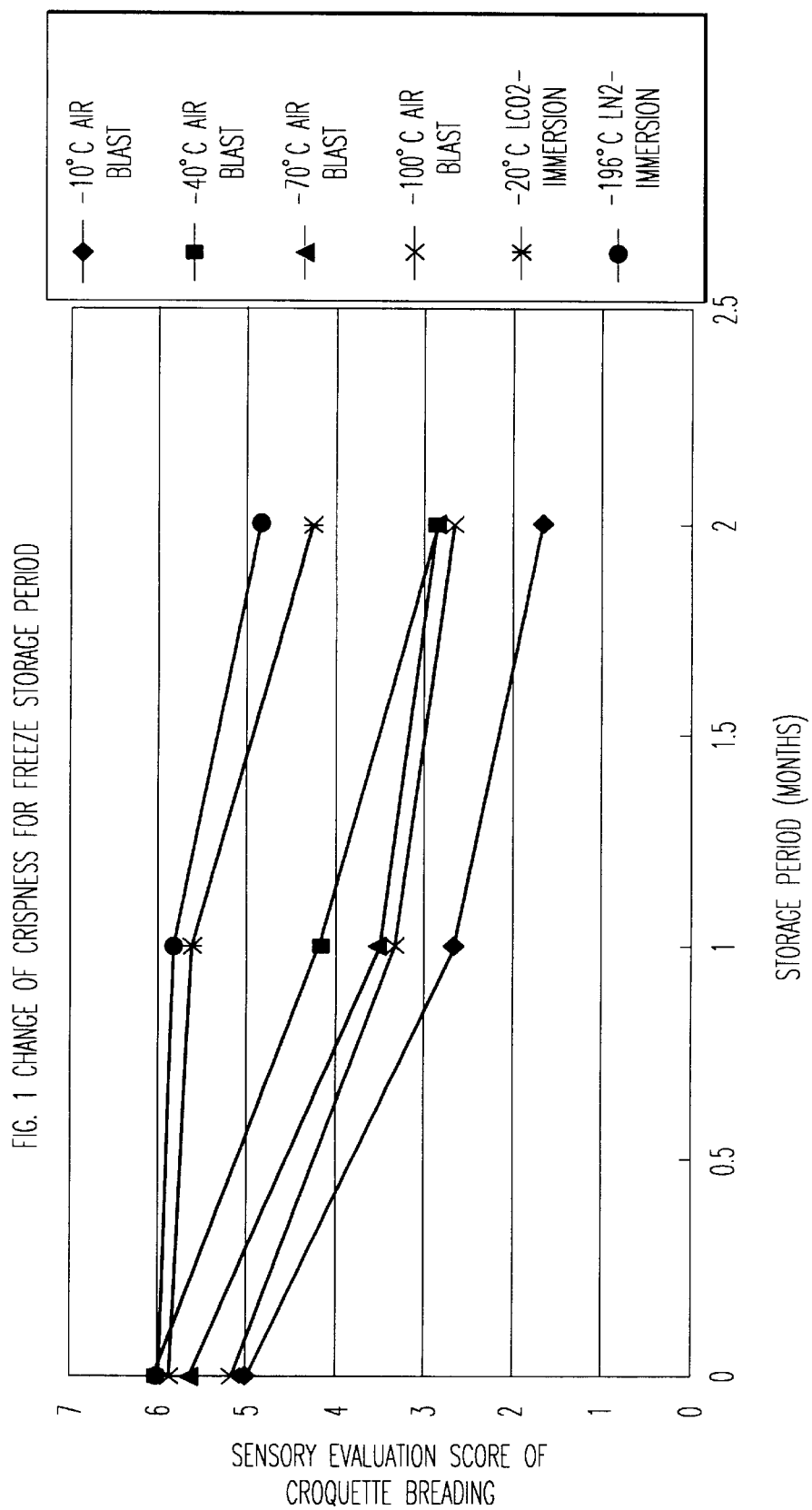

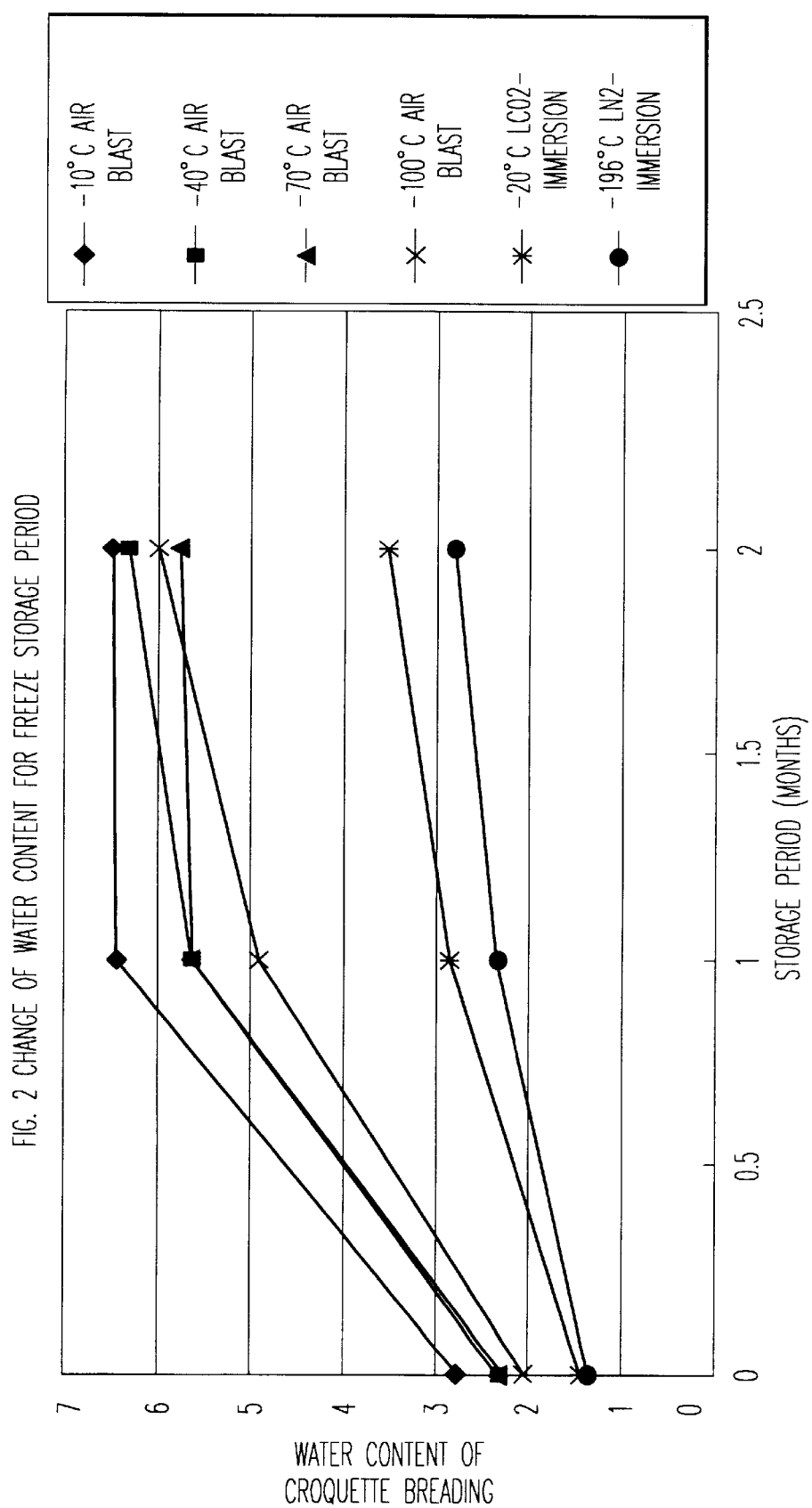

METHOD FOR PRODUCING FROZEN FRIED FOODS FOR MICROWAVE COOKING

BACKGROUND OF THE INVENTION

1. Field of the Invention

The present invention relates to a method for producing a frozen product of deep-fat (oil-cooked) fried food (frozen fried food) for a microwave oven cooking, particularly a microwave cooking-oriented frozen food of a deep-fat (oil-cooked) fried food, such as croquettes, breaded fried shrimps, squid fritters, chicken cutlets, beef cutlets, and the like, as well as a frozen fried food thus obtained or which can be obtained in the method.

A frozen product of cooked fried food such as a deep-fat fried croquette and a breaded fried shrimp can be stored for a prolonged period and can readily be consumed after thawing and re-heating it. A trend of a recent increase in the number of working women or of people who are active late at night or early in the morning causes a change in a lifestyle, a marked spread of the use of a microwave oven, and an increase in the number of convenience stores, food courts or roadside restaurants, which lead to an increased demand of frozen foods which can readily be served after microwave cooking. There are a large number of the types of core materials (filling materials; "Guzai" in Japanese) especially of fried foods, and the lighter crispness (crunchiness; good eating quality) peculiar to the breading (coat; "Koromo" in Japanese) of any of such foods in harmony with juicy core materials is preferred widely.

2. Description of the Related Art

A frozen fried food has conventionally been produced by freezing the food directly after a thorough oil cooking similarly to an ordinary fried food. In the case of a fried food whose crispness (crunchiness) is favored, a conventional method for freezing, however, poses a problematic loss of the crispness associated naturally with a fried food, since the breading of the fried food is softened and moistened by the water generated from the core materials upon the microwave cooking just before eating. This softening of the breading due to the migration of water tends to be marked much more problematically after being stored frozen for a prolonged period longer.

In order to solve the problems described above, various technologies have been proposed. Those which can be exemplified are a method for keeping the surface of a breading at a low water content by retarding the migration of the water generated from the core materials to the breading surface layer which is achieved by an oil cooking followed immediately by a quick freezing followed by a storage as being frozen at a temperature of −30° C. or lower (refer to JP-A-6-141788), a method for drying a breading by blowing a dried air at 0 to 15° C. before freezing (refer to JP-A-51-7137), a method for preventing an ooze-out of water upon a microwave cooking by dehydrating a pre-processed core materials, by a microwave heating under reduced pressure and the like (refer to JP-A-11-266801), a method for maintaining a crispness by freezing a deep-fat fried food together with a desiccant as being wrapped with a water vapor-impermeable film whereby drying a breading during the freezing (refer to JP-A-5-64574), a method for preventing the softening of a breading due to the migration of water from the core materials by forming a double-layered structure comprising a first breading formed by steaming a purified starch and a second breading formed on the surface of said first breading by oil-cooking a deep-frying batter consisting mainly of a wheat flour for flying (refer to JP-A-11-123055), a method for improving the crispness of a breading material itself by producing a frozen fried food from a dry breading (crumb) mixed with a corn flour (refer to JP-A-4-53459), a method for improving the crispness by coating a fried food with an edible aqueous solution of pullulan, wafer, gelatin and the like (refer to JP-A-2-283248), and the like.

On the other hand, the following methods are known for freezing a food for producing a frozen food (see, "SHOKU-HIN KIKAI SOUCHI (Machinery and equipment for food industry)", p64–68 (1995), "REITOU (Refrigeration)", Vol. 70, No. 809 (1995), "REITOU (Refrigeration)", Vol. 61, No. 703, and the like).

(a) Gas contact freezing method (air blast freezing method)

It is used most frequently, and comprises blowing an air at about (approximately) −35 to −40° C. at a flow rate of about 5 to 10 m/sec to effect freezing.

(b) Solid contact freezing method (contact freezing method)

It comprises bringing a subject food into a direct contact with a metal plate cooled at about −35 to −40° C. to effect freezing.

(c) Liquefied gas spray freezing method

It comprises a direct spraying of a low temperature liquefied gas such as a liquid carbon dioxide ($CO_2$), a liquid nitrogen ($N_2$), and the like onto a subject food and utilizing a latent heat of evaporation and a sensible heat to effect freezing.

(d) Liquid immersion freezing method

It comprises a direct immersion of a subject food in a low temperature liquid (for example, calcium chloride brine, ethanol brine, propylene glycol brine, liquid carbon dioxide, liquid nitrogen, and the like) to effect freezing.

Any of these conventional freezing methods can generally be referred to as "a quick freezing method". A quick freezing is defined as a process in which the time period required for the food temperature to be lowered across the maximum ice crystal forming range of −1 to −5° C. is not longer than 30 minutes or a moving speed of the freezing front V as a distance over which the freezing boundary front is advanced per one hour from the surface to the internal region of a food is 5 to 20 cm/h. Nevertheless, such condition of a quick freezing is not satisfied precisely in most of the cases, and used mostly rather as a guideline for ensuring a normal freezing operation in a manufacturing process (refer to NIPPON SHOKUHIN KOGYO GAKKAISHI (Journal of the Japanese society for food science and technology), 39, 7, 608 (1992)).

Processes (a) to (d) each of which is referred to "a quick freezing method" use practically diverse cooling rates and freezing efficiencies, and are selected appropriately based on the condition and the quality of a food product to be frozen being weighed against a cost. Especially in Process (d), a very low temperature such as −196° C. under atmospheric pressure (with a liquid nitrogen) and −20° C./1.96 MPa (liquid carbon dioxide) is utilized without any need of consideration for the effect of the heat transfer, i.e., the effect of the heat transmitted from air to a food product, whereby enabling a very quick freezing when compared with a gas contact method used mainly these days. Accordingly, a quality which can not be expected by any of Processes (a) to (c) is associated characteristically.

A freezing method of Process (d) described above is used usually in processing a raw material (perishable foodstuff)

before cooking consisting of cells such as a tuna fish and a livestock meat especially in which an improved quality is beneficial significantly, since it uses a very quick freezing which allows an intracellular water to become a fine ice crystal, thus enabling a freezing without any damage on a food matrix resulted from the growth of the ice crystal. However, this ability of preventing a cell destruction itself can not be expected to contribute to an achievement of an increased crispness (crunchiness; better eating quality) of a cooked frozen fried food, and no positive application of such very quick freezing method to a production of a frozen product of deep-fat (oil-cooked) fried food for a microwave oven cooking can be found.

SUMMARY OF THE INVENTION

Problems to be Solved by the Invention

Among the conventional methods described above, the method using a direct drying of the core materials (filling materials) and the breading material allows the water associated originally with the core materials to be lost significantly, resulting in a significant reduction in the juiciness of the core materials which is desirable in a fried food, while the method for improving the characteristics of a breading material also suffering from an insufficiency in eliminating the problematic migration of the water into the breading layer during a storage as being frozen.

Thus, the present invention is intended to solve the problems described above, and its objective is typically to provide a method for producing a frozen product of deep-fat fried food (frozen fried food) capable of exhibiting, after a microwave oven heating, a favorable crispness of a breading like one experienced just after frying while preserving a juiciness associated originally with core materials and also capable of maintaining the original juiciness and crispness feeling even after a prolonged storage in a domestic freezer.

Disclosure of the Invention

A method for producing a frozen fried food for a microwave cooking, particularly a frozen product of deep-fat (oil-cooked) fried food for a microwave cooking according to the present invention with which the objective described above can be accomplished is based on a method comprising the step of a freezing of, particularly a very quick freezing (an immediate quick freezing) of a deep-fat fried food, preferably immediately after oil-cooking thereof, at a moving speed of the freezing front of 20 cm/h or higher, preferably of exceeding 20 cm/h, more preferably of 40 cm/h or higher, and also encompasses the following aspects in the present invention.

(1) A method for producing a frozen fried food for a microwave oven cooking, comprising the step of a freezing of, preferably a very quick freezing (an immediate quick (rapid) freezing) of, a deep-fat (an oil-cooked) fried food, more preferably immediately after oil-cooking thereof, at a moving speed of the freezing front exceeding 20 cm/h.

(2) A method for producing a frozen fried food for a microwave oven cooking, comprising the step of freezing a deep-fat fried food, preferably immediately after oil-cooking thereof, at a moving speed of the freezing front exceeding 20 cm/h followed by a storage of the frozen food thus obtained at a temperature of −10° C. or lower.

(3) A method for producing a frozen fried food for a microwave oven cooking according to the above Section (1) or (2), wherein said moving speed of the freezing front is 40 cm/h or higher.

(4) The method according to any one of the above sections (1) to (3), wherein said freezing is conducted by a method selected from a liquid nitrogen immersion method and a liquid carbon dioxide immersion method.

(5) The method according to any one of the above sections (2) to (4), wherein said temperature at which said frozen food is stored is within the range from −10° C. to −25° C.

(6) A frozen fried food for a microwave cooking, which is or can be obtained in the method according to any one of the above sections (1) to (5).

BRIEF DESCRIPTION OF THE DRAWINGS

[FIG. 1]

FIG. 1 is a graph showing the change with the passage of time in the crispness of the breading of a croquette which was frozen at a varying moving speed of the freezing front (Change of crispness for freeze storage period), which was obtained in the examples.

$LCO_2$: liquid carbon dioxide; $LN_2$: liquid nitrogen.

[FIG. 2]

FIG. 2 is a graph showing the change with the passage of time in the water content of the breading of a croquette which was frozen at a varying moving speed of the freezing front (Change of water content for freeze storage period), which was obtained in the examples.

$LCO_2$: liquid carbon dioxide; $LN_2$: liquid nitrogen.

DESCRIPTION OF THE PREFERRED EMBODIMENTS

In the present invention, a deep-fat fried food is subjected to a very quick freezing (an immediate quick freezing), preferably immediately or shortly after the oil-cooking thereof. Such very quick freezing means a very rapid freezing, and one in a process in which a moving speed of the freezing front V (cm/h) when defined as a distance over which the freezing front is advanced per one hour from the surface to the internal region of a food to be frozen is 20 cm/h or higher which has not been used conventionally in producing a frozen deep-fat fried food, more preferably is 40 cm/h or higher. A higher moving speed of the freezing front value enables a faster immobilization of the water contained in the core materials and the breading batter layer, whereby preventing the migration of the water into the breading to the utmost and preserving the crispness unique to a fried food even after a freezer storage (prolonged freezing).

The expression "immediately" described above is used here to mean a time period during which the water in the core materials of a deep-fat fried food does not migrate into a breading. Generally, it is preferable that the deep-fat fried food is frozen immediately after it is fried and then cooled. Namely, the freezing in the present invention is preferably performed immediately after (shortly after) the deep-fat fried food is cooled after the oil-cooking thereof.

A preferred embodiment of the present invention includes a freezing process which can give a frozen deep-fat fried food whose breading has a water content of 3% by weight or less after being heated by a microwave oven before eating.

Said very quick freezing involved in the method of the present invention is not particularly limited, provided that the freezing is effected at a moving speed of the freezing front V (cm/h) defined as described above exceeding 20 cm/h which has not been used conventionally in producing a frozen deep-fat fried food, more preferably of 40 cm/h or higher. In order to obtain such moving speed of the freezing front V (cm/h), it is preferable to use a liquid nitrogen immersion method or a liquid carbon dioxide immersion method in view of a less effect on a food.

The fried food to be frozen by the method according to the present invention contains core materials used usually in an ordinary fried food including a croquette, such as various vegetables including potatoes, onion, pumpkin, green pepper, mushrooms and the like, sea foods including shrimp, squid, crab, scallop and the like, and livestock meet such as chicken, beef, pork and the like, and may for example be a food which is or may be fried by an ordinary method and is not limited particularly on the basis of the core materials and the like.

A material for covering the core materials in the fried food described above is not particularly limited, and may be a breading material such as a batter and the like used in an ordinary fried food.

This application is based on Japanese Patent Application Serial No. 2000-033737, filed on Feb. 10, 2000, which is incorporated herein by reference in its entirety.

EXAMPLES

The present invention is further described in the following examples, which are not intended to restrict the present invention.

69 Grams as a final finishing weight of a frozen DANSHAKU potato (a kind of potato in Japan) croquette was fried with a salad oil at 170 to 180° C. An oil-cooked (deep-fat) DANSHAKU potato croquette thus obtained was once cooled and then subjected to a quick freezing (or a very quick freezing) by each of an air blast at −10° C. [moving speed of the freezing front=2.2 cm/h; maximum ice crystal forming range (−1 to −5° C.) passing time=68.87 min], an air blast at −40° C. [moving speed of the freezing front=3.6 cm/h; maximum ice crystal forming range (−1 to −5° C.) passing time=11.13 min], an air blast at −70° C. [moving speed of the freezing front=6.9 cm/h; maximum ice crystal forming range (−1 to −5° C.) passing time=4.23 min], an air blast at −100° C. [moving speed of the freezing front=10.8 cm/h; maximum ice crystal forming range (−1 to −5° C.) passing time=1.53 min], a liquid carbon dioxide immersion at −20° C./1.96 MPa [moving speed of the freezing front= 25.0 cm/h; maximum ice crystal forming range (−1 to −5° C.) passing time=0.30 min] and a liquid nitrogen immersion at −196° C. [moving speed of the freezing front=68.2 cm/h; maximum ice crystal forming range (−1 to −5° C.) passing time=0.05 min].

Each of the frozen croquettes thus obtained having different moving speed of the freezing front was stored as frozen ordinarily each for 1 month and for 2 months in a refrigerator at −18° C. After the storage, each frozen croquette was placed as still frozen in a microwave oven and heated at 500 W for 1 minute/1 piece and then subjected to a sensory evaluation by 6 panelists for the crispness of each breading after each storage period. The croquette was judged as any of the scores from 1 (worst) to 9 (best) with score 5 being assigned to a commercial product A.

The results are shown in Table 1 and FIG. 1 (Change of crispness for freeze storage period). The scores were on the basis of the summarized opinions of the panelists.

As evident from FIG. 1, the air blast processes at the freezing temperatures of −10° C. (moving speed of the freezing front=2.2 cm/h), −40° C. (moving speed of the freezing front=3.6 cm/h), −70° C. (moving speed of the freezing front=6.9 cm/h) and −100° C. (moving speed of the freezing front=10.8 cm/h) were in a marked contrast with the liquid carbon dioxide immersion at −20° C./1.96 MPa (moving speed of the freezing front=25.0 cm/h) which gave an more excellent crispness favorable and with the liquid nitrogen immersion at the lowest freezing temperature of −196° C. (moving speed of the freezing front=68.2 cm/h) which gave a further favorable crispness, which shows a further more favorable eating quality.

As is evident from the results described above, the difference in the crispness between the frozen food by the liquid carbon dioxide immersion at −20° C. m/1.96 MPa or the liquid nitrogen immersion at −196° C. and the frozen food by any of the other methods became much more marked after a longer storage period. Thus, the effect of the moving speed of the freezing front becomes evident after a certain storage period, and the present invention is proven to be able to achieve a crispness similar to that experienced just after frying even after the storage for 2 months.

On the other hand, each frozen croquette obtained under the respective condition described above was cooked by a microwave oven, allowed to stand for 1 minute at room temperature, cooled for 2 minutes in a freezer at −40° C., cut into two pieces in halves and cooled again for 2 minutes in a freezer at −40° C., and then the surface of the breading of each croquette was scraped and examined for a water content by a drying method (allowed to stand in a thermostat chamber at 105° C. for 4 hours) according to the equation shown below.

$$\text{Water content} = (W1 - W2)/W1 \times 100$$

W1: Breading weight before dehydration

W2: Breading weight after dehydration

The relationship between the storage time period and the water content a breading is shown Table 2 and FIG. 2 (Change of water content for freeze storage period).

FIG. 2 indicates that a higher moving speed of the freezing front gave a lower water content kept over a prolonged storage, and, combined with the results shown in FIG. 1, reflects a higher crispness, even after a prolonged storage, of a breading processed at a higher moving speed of the freezing front.

TABLE 1

Change of crispness for freeze storage period
Croquette

| Storage Period (month) | −10° C. (Air Blast) | −40° C. (Air Blast) | −70° C. (Air Blast) | −100° C. (Air Blast) | −20° C. (LCO2-Immersion) | −196° C. (LN2-Immersion) |
|---|---|---|---|---|---|---|
| 0 | 5.00 | 6.00 | 5.67 | 5.17 | 5.90 | 6.00 |
| 1 | 2.67 | 4.17 | 3.50 | 3.33 | 5.63 | 5.83 |
| 2 | 1.67 | 2.83 | 2.83 | 2.67 | 4.23 | 4.83 |

TABLE 2

Change of water content for freeze storage period

| Storage Period (month) | −10° C. (Air Blast) | −40° C. (Air Blast) | −70° C. (Air Blast) | −100° C. (Air Blast) | −20° C. (LCO2-Immersion) | −196° C. (LN2-Immersion) |
| --- | --- | --- | --- | --- | --- | --- |
| 0 | 2.78 | 2.29 | 2.35 | 2.09 | 1.46 | 1.36 |
| 1 | 6.43 | 5.63 | 5.60 | 4.90 | 2.85 | 2.33 |
| 2 | 6.47 | 6.28 | 5.74 | 5.99 | 3.50 | 2.78 |

Effect of the Invention

As detailed above, in the present invention, by subjecting a deep-fat (oil-cooked) fried food, particularly immediately after frying to a very quick freezing (immediate quick freezing) at a moving speed of the freezing front exceeding 20 cm/h, preferably of 40 cm/h or higher, the water contained in the core materials and the breading batter layer thereof can be immobilized immediately to prevent the migration of the water from them into the breading layer as much as possible. As a result, a frozen product of deep-fat fried food which exhibits a just-fried (just oil-cooked) crispness, which shows a favorable good eating quality, even after heated by a microwave subsequent to a freezer storage (prolonged freezing) can be obtained.

What is claimed is:

1. A method for producing a frozen fried food for microwave cooking, comprising the step of:
   (1) freezing a deep-fat fried food at a rate of freezing such that a freezing front has a moving speed exceeding 20 cm/h, to obtain said frozen food.

2. The method of claim 1, wherein said freezing front has a moving speed of 40 cm/h or higher.

3. The method of claim 1, wherein said freezing is conducted by a method selected from the group consisting of liquid nitrogen immersion methods and liquid carbon dioxide immersion methods.

4. The method of claim 1, wherein said freezing is performed immediately after oil-cooking said deep-fat fried food.

5. The method of claim 1, further comprising the step of:
   (ii) storing said frozen food at a temperature of −10° C. or lower.

6. The method of claim 5, wherein said freezing is performed immediately after oil-cooking said deep-fat fried food.

7. The method of claim 5, wherein said freezing front has a moving speed of 40 cm/h or higher.

8. The method of claim 5, wherein said freezing is conducted by a method selected from the group consisting of liquid nitrogen immersion methods and liquid carbon dioxide immersion methods.

9. The method of claim 5, wherein said temperature at which said frozen food is stored is within the range from −10° C. to −25° C.

10. A frozen fried food for a microwave cooking, which is prepared by a method comprising the step of:
    (1) freezing a deep-fat fried food at a rate of freezing such that a freezing front has a moving speed exceeding 20 cm/h, to obtain said frozen food.

11. The frozen fried food of claim 10, wherein said freezing front has a moving speed of 40 cm/h or higher.

12. The frozen fried food of claim 10, wherein said freezing is conducted by a method selected from the group consisting of liquid nitrogen immersion methods and liquid carbon dioxide immersion methods.

13. The frozen fried food of claim 10, wherein said freezing is performed immediately after oil-cooking said deep-fat fried food.

14. The frozen fried food of claim 10, wherein said method further comprises the step of:
    (ii) storing said frozen food at a temperature of −10° C. or lower.

15. The frozen fried food of claim 14, wherein said freezing is performed immediately after oil-cooking said deep-fat fried food.

16. The frozen fried food of claim 14, wherein said freezing front has a moving speed of 40 cm/h or higher.

17. The frozen fried food of claim 14, wherein said freezing is conducted by a method selected from the group consisting of liquid nitrogen immersion methods and liquid carbon dioxide immersion methods.

18. The frozen fried food of claim 14, wherein said temperature at which said frozen food is stored is within the range from −10° C. to −25° C.

* * * * *